(12) United States Patent
Tripathi et al.

(10) Patent No.: US 11,250,212 B2
(45) Date of Patent: Feb. 15, 2022

(54) SYSTEM AND METHOD FOR INTERPRETING CONTEXTUAL MEANING OF DATA

(71) Applicant: Innoplexus AG, Eschborn (DE)

(72) Inventors: Gaurav Tripathi, Pune (IN); Vatsal Agarwal, Rampur (IN)

(73) Assignee: Innoplexus AG, Eschborn (DE)

( * ) Notice: Subject to any disclaimer, the term of this patent is extended or adjusted under 35 U.S.C. 154(b) by 167 days.

(21) Appl. No.: 16/369,387

(22) Filed: Mar. 29, 2019

(65) Prior Publication Data

US 2020/0311344 A1 Oct. 1, 2020

(51) Int. Cl.
| | | |
|---|---|---|
| G06F 40/284 | (2020.01) | |
| G06F 16/93 | (2019.01) | |
| G06F 16/22 | (2019.01) | |
| G06F 40/295 | (2020.01) | |
| G06N 5/04 | (2006.01) | |
| G06F 40/30 | (2020.01) | |
| G06N 20/00 | (2019.01) | |

(52) U.S. Cl.
CPC ........ *G06F 40/284* (2020.01); *G06F 16/2264* (2019.01); *G06F 16/93* (2019.01); *G06F 40/295* (2020.01); *G06F 40/30* (2020.01); *G06N 5/04* (2013.01); *G06N 20/00* (2019.01)

(58) Field of Classification Search
CPC .... G06F 40/284; G06F 16/93; G06F 16/2264; G06F 40/295; G06F 40/30; G06N 5/04; G06N 20/00
See application file for complete search history.

(56) References Cited

U.S. PATENT DOCUMENTS

| | | | | |
|---|---|---|---|---|
| 5,619,709 A | * | 4/1997 | Caid | ............... G06F 16/58 715/209 |
| 7,251,637 B1 | * | 7/2007 | Caid | ............... G06K 9/4623 706/15 |
| 9,244,908 B2 | * | 1/2016 | Kim | ............... G06Q 30/0256 |
| 10,255,326 B1 | * | 4/2019 | Siegel | ............... G06F 16/3334 |
| 10,409,803 B1 | * | 9/2019 | Lai | ............... G06F 16/2365 |
| 10,936,810 B2 | * | 3/2021 | Sobran | ............... G06F 16/9027 |
| 2011/0218947 A1 | * | 9/2011 | Vadlamani | ............... G06F 16/00 706/12 |
| 2013/0262086 A1 | * | 10/2013 | Kim | ............... G06Q 30/0256 704/9 |
| 2014/0095478 A1 | * | 4/2014 | Lamba | ............... G06F 16/3329 707/722 |
| 2014/0279729 A1 | * | 9/2014 | Delaney | ............... G06N 20/00 706/12 |
| 2015/0039611 A1 | * | 2/2015 | Deshpande | ............... G06F 16/285 707/737 |
| 2015/0142419 A1 | * | 5/2015 | Edwards | ............... G06F 40/30 704/9 |

(Continued)

*Primary Examiner* — Jonathan C Kim

(74) *Attorney, Agent, or Firm* — Ziegler IP Law Group, LLC

(57) ABSTRACT

A data processing arrangement is configured to obtain plurality of documents including sentences, analyze sentences of plurality of documents to determine specific domain associated with each of plurality of documents, tokenize sentences in each of plurality of documents to obtain plurality of tokens for each of plurality of documents, determine token coordinates of each of plurality of tokens, and interpret contextual meaning of each of tokens of plurality of tokens for each of plurality of documents.

13 Claims, 2 Drawing Sheets

(56) References Cited

U.S. PATENT DOCUMENTS

| | | | |
|---|---|---|---|
| 2016/0188568 A1* | 6/2016 | Srinivasan | G06F 40/30 |
| | | | 704/9 |
| 2017/0235895 A1* | 8/2017 | Cox | G06F 40/279 |
| 2017/0337268 A1* | 11/2017 | Ait-Mokhtar | G06F 16/367 |
| 2018/0173698 A1* | 6/2018 | Dubey | G06F 40/30 |
| 2018/0365207 A1* | 12/2018 | Saetrom | G06F 40/117 |
| 2019/0130248 A1* | 5/2019 | Zhong | G06F 16/2462 |
| 2019/0392082 A1* | 12/2019 | Bell | G06N 20/00 |
| 2020/0073787 A1* | 3/2020 | Saha | G06F 16/245 |
| 2020/0104357 A1* | 4/2020 | Bellegarda | G06N 3/0472 |
| 2020/0104359 A1* | 4/2020 | Patel | G06N 3/0472 |
| 2020/0104416 A1* | 4/2020 | Agarwal | G06F 16/2428 |
| 2020/0175102 A1* | 6/2020 | Sobran | G06F 40/216 |
| 2020/0311115 A1* | 10/2020 | Tomberg | G06N 3/084 |
| 2020/0311345 A1* | 10/2020 | Patel | G06F 40/284 |
| 2021/0034646 A1* | 2/2021 | Singh | G06F 16/245 |

\* cited by examiner

SYSTEM AND METHOD FOR INTERPRETING CONTEXTUAL MEANING OF DATA

TECHNICAL FIELD

The present disclosure relates generally to data interpretation; and more specifically, to systems for interpreting contextual meaning of data stored in plurality of documents. Moreover, the present disclosure relates to methods implemented via aforementioned systems for interpreting contextual meaning of data stored in plurality of documents. Furthermore, the present disclosure relates to computer readable medium containing program instructions for execution on computer systems, which when executed by a computer, cause the computer to perform aforementioned methods.

BACKGROUND

Nowadays, natural language processing technique has been used to understand and interpret information stored in documents. However, natural language processing technique has several limitations associated therewith. Natural language processing technique classifies documents incorrectly based on the information present in the documents. In an example, documents relating to cartographer's map, mean average precision, and mean arterial pressure may all be classified as documents having information about maps by the natural language processing technique.

Moreover, the interpretation of information by the natural language processing technique is inefficient and flawed. In an example, natural language processing technique may interpret information relating to gift as information relating to poison as in German language gift means poison. Furthermore, in a scenario wherein documents are retrieved from a database by interpreting a search query, large amounts of irrelevant documents are retrieved by the natural language processing technique. In an example, upon retrieval of documents for a search query relating to cancer, documents comprising information about harmful effects of using detergents and its cancer-causing effects are retrieved. In such an example, the retrieved documents may be irrelevant as search query is focused on cancer while documents retrieved are focused on detergents. Moreover, researchers employ large amounts of documents for performing research work, the retrieval of irrelevant documents may result in incorrect outcomes of the research work.

As a result of the limitations associated with natural language processing technique, a process involved in understanding and interpreting of the information by natural language processing technique is resource intensive. A processor used for processing the information runs on high computational load which reduces performance of the processor. Moreover, retrieval of irrelevant documents makes the process memory intensive. Moreover, irrelevant documents occupy unnecessarily high amount of space in a RAM (Random Access Memory) of the processor resulting in unavailability of RAM for performing other tasks of the processor and further reduces computational speed of the processor. Furthermore, there is a limitation in a size of a display module employed for displaying the interpreted information. In an example, large amounts of retrieved documents may not be displayed on the display module.

Therefore, in the light of foregoing discussion, there exists a need to overcome the aforementioned drawbacks associated with understanding and interpreting information.

SUMMARY

The present disclosure seeks to provide a system for interpreting contextual meaning of data stored in plurality of documents. The present disclosure also seeks to provide a method implemented via aforementioned system for interpreting contextual meaning of data stored in plurality of documents. The present disclosure also seeks to provide a computer readable medium containing program instruction(s) for execution on a computer system, which when executed by a computer, cause the computer to perform aforementioned method.

The present disclosure seeks to provide a solution to the existing problem of inaccurate understanding and interpreting of data stored in documents. An aim of the present disclosure is to provide a solution that overcomes at least partially the problems encountered in prior art, and provides accurate contextual meaning of data stored in documents.

In one aspect, an embodiment of the present disclosure provides a system comprising:
  a data processing arrangement configured to:
    obtain a plurality of documents including one or more sentences;
    analyze, using an analyzer module, the one or more sentences of the plurality of documents to determine a specific domain associated with each of the plurality of documents;
    tokenize, using a tokenizer module, the one or more sentences in each of the plurality of documents to obtain a plurality of tokens for each of the plurality of documents;
    determine token coordinates of each of the plurality of tokens in a multi-dimensional space; and
    interpret, using an interpreter module, a contextual meaning of each of the tokens of the plurality of tokens for each of the plurality of documents.

In another aspect, an embodiment of the present disclosure provides a method implemented via a system comprising:
  a data processing arrangement configured to:
    obtain a plurality of documents including one or more sentences;
    analyze, using an analyzer module, the one or more sentences of the plurality of documents to determine a specific domain associated with each of the plurality of documents;
    tokenize, using a tokenizer module, the one or more sentences in each of the plurality of documents to obtain a plurality of tokens for each of the plurality of documents;
    determine token coordinates of each of the plurality of tokens in a multi-dimensional space; and
    interpret, using an interpreter module, a contextual meaning of each of the tokens of the plurality of tokens for each of the plurality of documents.

In yet another aspect, an embodiment of the present disclosure provides a computer readable medium containing program instruction(s) for execution on a computer system, which when executed by a computer, cause the computer to perform a method, wherein the method is implemented via a system comprising:
  a data processing arrangement configured to:
    obtain a plurality of documents including one or more sentences;
    analyze, using an analyzer module, the one or more sentences of the plurality of documents to determine a specific domain associated with each of the plurality of documents;

tokenize, using a tokenizer module, the one or more sentences in each of the plurality of documents to obtain a plurality of tokens for each of the plurality of documents;

determine token coordinates of each of the plurality of tokens in a multi-dimensional space; and interpret, using an interpreter module, a contextual meaning of each of the tokens of the plurality of tokens for each of the plurality of documents.

Embodiments of the present disclosure substantially eliminate or at least partially address the aforementioned problems in the prior art, and enable accurate determination of contextual meaning of data stored in documents based on domain of the documents.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
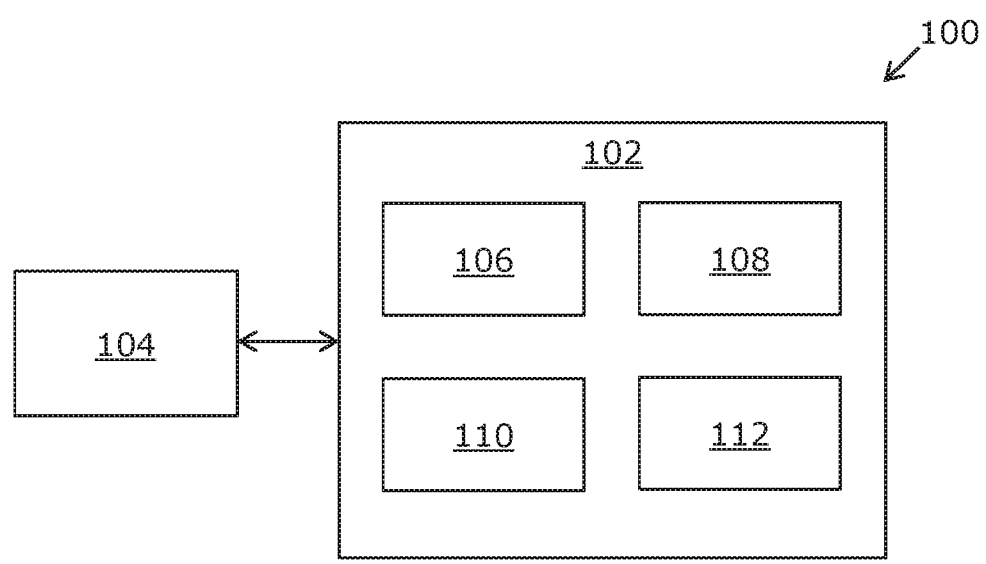
FIG. 1 is a block diagram of a system comprising a data processing arrangement, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system comprising:

a data processing arrangement configured to:

obtain a plurality of documents including one or more sentences;

analyze, using an analyzer module, the one or more sentences of the plurality of documents to determine a specific domain associated with each of the plurality of documents;

tokenize, using a tokenizes module, the one or more sentences in each of the plurality of documents to obtain a plurality of tokens for each of the plurality of documents;

determine token coordinates of each of the plurality of tokens in a multi-dimensional space; and interpret, using an interpreter module, a contextual meaning of each of the tokens of the plurality of tokens for each of the plurality of documents.

In another aspect, an embodiment of the present disclosure provides a method implemented via a system comprising:

a data processing arrangement configured to:

obtain a plurality of documents including one or more sentences;

analyze, using an analyzer module, the one or more sentences of the plurality of documents to determine a specific domain associated with each of the plurality of documents;

tokenize, using a tokenizer module, the one or more sentences in each of the plurality of documents to obtain a plurality of tokens for each of the plurality of documents;

determine token coordinates of each of the plurality of tokens in a multi-dimensional space; and interpret, using an interpreter module, a contextual meaning of each of the tokens of the plurality of tokens for each of the plurality of documents.

In yet another aspect, an embodiment of the present disclosure provides a computer readable medium containing program instruction(s) for execution on a computer system, which when executed by a computer, cause the computer to perform a method, wherein the method is implemented via a system comprising:

a data processing arrangement configured to:

obtain a plurality of documents including one or more sentences;

analyze, using an analyzer module, the one or more sentences of the plurality of documents to determine a specific domain associated with each of the plurality of documents;

tokenize, using a tokenizer module, the one or more sentences in each of the plurality of documents to obtain a plurality of tokens for each of the plurality of documents;

determine token coordinates of each of the plurality of tokens in the multi-dimensional space; and interpret, using an interpreter module, a contextual meaning of each of the tokens of the plurality of tokens for each of the plurality of documents.

The aforesaid system and method provide techniques to determine and interpret contextual meaning of information stored in the plurality of documents. Moreover, the system comprises the ontological databank and the data processing arrangement. The system interprets contextual meaning of information stored in the plurality of documents based on the determination of domain and language of the plurality of documents enabling the system to efficiently interpret the contextual meaning of the information. Consequently, the system correctly classifies the plurality of documents based on the domain and language of the information. Moreover, in a scenario, wherein documents are retrieved from a database by interpreting a search query, the system retrieves a small chunk of documents relevant to the search query. However, in such a scenario, existing systems retrieve large amounts of documents comprising relevant and irrelevant information.

Beneficially, the system comprising a processor to determine and interpret contextual meaning of information stored in the plurality of documents requires RAM (Random Access Memory) with less storage space as only small chunk of documents is occupied in the storage space of the RAM. Moreover, the system minimizes the resource consumption of the processor. Consequently, the RAM is available for performing other tasks of the processor and further increases computational speed of the processor. Additionally, the system requires less computing power compared to high computing power required by the existing system. It will be appreciated that, the small chunk of documents retrieved by the system enables the system to display all the retrieved documents on a display module. Therefore, the system is economical for interpreting contextual meaning of the plurality of documents.

The present disclosure provides the system comprising the data processing arrangement. The system is a collection of one or more interconnected programmable and/or non-programmable components configured to determine and interpret contextual meaning of data stored in the plurality of documents. Examples include programmable and/or non-programmable components, such as processors, memories, connectors, cables and the like. Moreover, the programmable components are configured to store and execute one or more computer instructions.

In an embodiment, the system further comprises an ontological databank, wherein the ontological databank includes information related to plurality of domains represented into a multi-dimensional space. The term "domain" refers to a subject matter category of a specific field such as computers, bio-technology, life science, medical science, pharmaceuticals, shopping, sports, finance, entertainment, music, or politics and the like. It will be appreciated that a given domain comprises one or more words relating to concepts, categories, and so forth of the given domain. In an example, the medical science domain may comprise one or more words such as lung cancer, PD1 antibody, treatment, eGFR and the like. In another example, the finance domain may comprise one or more words such as bullying, fixed asset, accrual and the like. Typically, the ontology defines properties associated with the one or more words and relations therebetween in the given domain. Throughout the present disclosure, the term "ontological databank" refers to a data repository that is configured to store information about the plurality of domains, wherein said information is indicative of types of domain, properties of the one or more words in the domains, description of the one or more words in the domains and semantic inter-relationships between the one or more words in a specific domain. It will be appreciated, a semantic inter-relationship between one or more words in the specific domain is indicative of a causal relationship between the one or more words of the domain that relate two given words. The description of the one or more words may include at least one of: a characteristic pertaining to spelling or sound of the word, grammatical behavior of the word, meaning of the word, and use of the word. It will be appreciated that the description of the one or more words comprises linguistic behavior of each of the words and meaning associated therewith. Optionally, the ontological databank is configured to store the information about the plurality of domains in a structured manner in a storage unit, such as memory of the ontological databank. It will be appreciated that the ontological databank may be a lexical ontology that defines knowledge pertaining to the utilization of the one or more words based on the properties and the relations, in the given domain.

It will be appreciated that there may be a plurality of ontological database pertaining to different domains. In an example, an ontological database may relate to biomedical domain. In another example, an ontological database may relate to energy domain. In yet another example, an ontological database may relate to automobile domain.

The ontological databank is represented into the multi-dimensional space. It will be appreciated that the multi-dimensional space is a multi-dimensional hierarchical space. In other words, the one or more words comprised in the ontological databank is embedded in the multi-dimensional hierarchical space. Throughout the present disclosure, the term "multi-dimensional hierarchical space" refers to an embedding space, wherein semantic relations (in form of, paths) are established between the one or more words in the given domain. Pursuant to embodiments of the present disclosure, the multi-dimensional hierarchical space embeds the one or more words comprised in the ontological databank such that meaning of each word of one or more words, is derived from a characteristic of embedding of the word in the multi-dimensional hierarchical space.

It will be appreciated that the one or more words embedded in the multi-dimensional hierarchical space have semantic relations with one another. Furthermore, optionally, the multi-dimensional hierarchical space is represented as a tree structure. Pursuant to embodiments of the present disclosure, the term "node" refers to a word from amongst the one or more words in the ontological databank, wherein the ontological databank is represented as the tree structure (namely, a node-link structure). Typically, in the tree structure, a node includes a pointer (namely, address) to a parent node. It will be appreciated that the node may or may not have a child node. Consequently, the node may or may not include a pointer to the child node. Moreover, the node may have 0, 1, 2, 3, and so on, number of child node associated therewith. The multi-dimensional hierarchical space uses the tree structure to establish sematic relations between the one or more words, in the ontological databank. Typically, the tree structure is instigated by a root node (namely, the starting point of the tree), wherein the root node is the highest-level node. The tree structure is terminated by leaf nodes (namely, the ending point of the tree), wherein the leaf nodes are the bottom-level nodes.

Typically, embedding of the one or more words in the multi-dimensional hierarchical space, organizes (namely, sorts) the one or more words such that the multi-dimensional hierarchical space reflects semantic and functional relations (such as, similarity) amongst the one or more words in the ontological databank. Optionally, a distance between a word from remainder of words (or, a length of a path between a word from remainder of words), in the ontological databank, may define semantic relation of the word with the remainder of the words. The semantic relations further reflect homophily properties associated with each word of the one or more words, found in real-world networks.

Throughout the present disclosure, the term "data processing arrangement" as used herein relates to programmable and/or non-programmable components configured to execute one or more software application for storing, processing, sharing data and/or set of instructions. Optionally, the data processing arrangement can include, for example, a component included within an electronic communications network. Additionally, the data processing arrangement include one or more data processing facilities for storing, processing, sharing data and/or set of instruction. Optionally, the data processing arrangement include functional components, for example, a processor, a memory, a network adapter and so forth.

Optionally, the data processing arrangement is communicably coupled to the ontological databank. Optionally, the data processing arrangement is communicably coupled to the ontological databank via one or more data communication networks. The one or more data communication networks may be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks and Worldwide Interoperability for Microwave Access (WiMAX) networks.

Moreover, the data processing arrangement is configured to obtain the plurality of documents including one or more sentences. Throughout the present disclosure, the term "plurality of documents" refers to a set of files in which data is recorded, wherein the data is recorded as a data type. Some examples of various data types are text data, tabular data, image data, and so forth. Thus, the plurality of documents may be in any suitable file formats depending upon the data type in which the data is recorded. Moreover, the plurality of documents further comprises associated attributes that relate to visual appearance thereof. In an example, the associated attribute may include a structure relating to the plurality of documents such as a layout of the document, a design of the document, and so forth. In another example, the associated attributes may include a format relating to the plurality of documents such as font, color, and image, and so forth. Optionally, each of the plurality of documents adheres to a subject area or a domain associated therewith. More optionally, each of the plurality of documents adheres to a language such as English, German, Chinese and the like. Optionally, each of the plurality of documents may be saved as a uniquely named file in one or more databases. More optionally, each of the plurality of documents may be received from a user via a user device such as cellular phones, personal digital assistants (PDAs), handheld devices, wireless modems, laptop computers, personal computers and the like.

Typically, the "one or more sentences" comprised in each of the plurality of documents refers to a collection of words that express a particular idea. The idea expressed by the one or more sentences relates to the subject area or the domain associated with the document. In other words, the one or more sentences contained in a given document conveys a brief description relating to the subject area or the domain associated with the given document. Optionally, the one or more sentences in the plurality of documents adhere to a particular language such as Japanese, English, Spanish, French and the like.

Furthermore, the data processing arrangement is configured to analyze the one or more sentences of the plurality of documents to determine the specific domain associated with each of the plurality of documents. It will be appreciated that the one or more sentences follow grammatical rules and syntaxes for their formation. Moreover, one or more sentences have linguistic features and stylistic aspects. Furthermore, each word of the collection of words in the one or more sentences is mapped and associated with each word of the one or more words in the ontological databank. Therefore, each word of the collection of words in the one or more sentences has properties and descriptions associated therewith. Moreover, the descriptions associated with each word of the collection of words include at least one of: characteristic pertaining to spelling or sound of the word, grammatical behavior of the word, meaning of the word. Moreover, each word of the collection of the words has semantic relations with other words in the collection of the words. The domain associated with each of the plurality of documents is determined by analyzing the properties and descriptions of a word in a given sentence with other words in the given sentence. Moreover, the domain is also determined by analyzing the properties and descriptions of one or more words in a sentence with one or more words in another sentence.

In an example, a sentence such as 'treatment of lung cancer' is included in a document. In such an example, words such as 'treatment', 'of' 'lung' 'cancer' have properties and description associated therewith. The properties and description of the words, and the linguistic features and stylistic aspects of the sentence enables the determination of the domain of the document to be medical science. In another example, sentences such as 'Excessive alcohol consumption is injurious to liver'. Functionality of liver is improved by consumption of water' is included in a document. In such an example, words such as 'injurious', 'liver' in the first sentence and words such as 'functionality', 'consumption', 'water' in the second sentence have properties and description associated therewith. The properties and description of the words in the two sentences, and the linguistic features and stylistic aspects of the two sentences enable the determination of the domain of the document to be medical science.

Moreover, the analyzer module is used to analyze the one or more sentences of the plurality of documents. Throughout the present disclosure, the term "analyzer module" refers to a structure including an arrangement of interconnected programmable and/or non-programmable components that are configured to receive, process and analyze the one or more sentences to determine the domain of the plurality of documents. Moreover, the analyzer module has a circuitry comprising one or more electronic components which enables the analyzer module to analyze the one or more sentences. The analyzer module is operable to employ programmable components to process the one or more sentences to map and associate the collection of word of the one or more sentences with the one or more words in the ontological databank. Moreover, the linguistic features and stylistic aspects of one or more sentences are analyzed by the analyzer module to determine the domain of the plurality of documents.

In an embodiment, the analyzer module analyses the one or more sentences of the plurality of documents to determine a specific language associated with each of the plurality of documents. It is to be understood that each specific language has specific words, pronunciations, and methods of combining the specific words that are used and understood by a considerable community. The analyzer module analyses the linguistic features and stylistic aspects of the one or more sentences. Moreover, the analyzer module analyses the properties and descriptions of words in the one or more sentences. The analysis enables the analyzer module to determine the specific language associated with each of the plurality of documents. Examples of specific language determined by the analyzer module are English, German, Chinese, Spanish and the like.

It is to be understood that determination of language and domain associated with each of the plurality of documents is implemented by the system prior to other steps such as tokenizing of the one or more sentences, determining of token coordinates, and identifying of entity type. The determination of language and domain associated with each of the plurality of documents prior to other steps enables the system to interpret accurate contextual meaning of the plurality of documents. Moreover, in a case involving retrieval of documents from a database based on a search query, a small chunk of documents is retrieved which are relevant to the search query as the system determines language and domain of the search query prior to other steps. However, existing systems retrieve documents without determination of language and domain of the search query resulting in retrieval of large number of documents such that only a small number of the large number of retrieved documents may be relevant.

Furthermore, the data processing arrangement is configured to tokenize, using the tokenizer module, the one or more sentences in each of the plurality of documents to obtain the plurality of tokens for each of the plurality of documents. Typically, the term "tokenize" refers to a process of breaking a sequence of strings into smaller entities. Additionally, the entities defined may be words, keywords, phrases, symbols, and so forth. The tokenizer module operates to classify entities of the sequence of strings. Pursuant to embodiments of the present disclosure, the one or more sentences is tokenized into the plurality of tokens (namely, entities). It will be appreciated that each sentence of the one or more sentences is a token. In an example, a sentence such as 'lung cancer treatment' may be tokenized into a token such as 'lung cancer treatment'. Similarly, each document of the plurality of documents is tokenized into a corresponding plurality of tokens. Throughout the present disclosure, the term "tokenizer module" refers to a structure including an arrangement of interconnected programmable and/or non-programmable components that are configured to receive, process and tokenize the one or more sentences to obtain the plurality of tokens. Moreover, the tokenizer module has a circuitry comprising one or more electronic components which enables the tokenizer module to tokenize the one or more sentences.

Optionally, the tokenizer module obtains the plurality of tokens based on at least one of: rules pertaining to lexeme, regular expressions, specific sequence of characters of one or more words, specific and separating characters (such as, punctuations, white spaces, and so forth). More optionally, the plurality of tokens may be made of alphabetic characters, alpha-numeric characters, or numeric characters. In an embodiment, the tokenizer module analyses a punctuation character (such as, a period '.') and white space so as to define tokens. In such a case, the punctuation character (namely, the period '.') may denote an abbreviation, a decimal point, an ellipsis, an email-address, or an end of a sentence.

Optionally, the plurality of tokens is obtained by breaking the one or more sentence in a way that each token of the plurality of tokens already exists as a word among the one or more words in the ontological databank. Optionally, n-gram model is used for segmenting the one or more sentences into one or more segments. It will be appreciated that the n-gram model relates to a contiguous sequence of 'n' items from a given one or more sentences, wherein 'n' represents number of segments. In this regard, one segment is referred as unigram or one-gram, two segments are referred as bigram or two-gram, three segments are referred as trigram or three-gram. Similarly, based on the number of the segments, the one or more segments is referred as "four-gram", "five-gram", and so on. In an example, the one or more segments generated for a search query such as "top drugs for cancer" may be "top drugs for cancer", "top drugs for", "drugs for cancer", "top drugs", "drugs for", "for cancer", "top", "drugs", "for" and "cancer". In such an example, the segment "top drugs for cancer" is the four-gram. Similarly, the segments "top drugs for", and "drugs for cancer" could be the trigram or three-gram, the segments "top drugs", "drugs for", and "for cancer" could be bigram or two-gram and the segments "top", "drugs", "for" and "cancer" could be unigram or one-gram. Moreover, the one or more segments are compared with the one or more words in the ontological databank. Moreover, based on the comparison, the one or more segments corresponding to one or more words in the ontological databank are referred to as the plurality of tokens.

In an embodiment, the tokenization of the one or more sentences further includes determining a frequency of occurrence of a given token in the plurality of documents for stop word identification; identifying one or more expressions associated to each of the plurality of tokens from the ontological databank; and analyzing the one or more expressions associated to each of the plurality of tokens to identify one or more relevant expressions associated to each of the plurality of tokens. Optionally, upon obtaining the plurality of tokens by the tokenizer module, the frequency of occurrence of a given token is determined to obtain stop words present in the plurality of documents. The term "stop words", refers to the words which are common and occur frequently in a specific domain or a specific language. In an example, words such as 'is', 'the', 'a', 'of' and the like may be stop words in English language. In an example, words such as 'cancer', 'tumor' may be stop words in medical sciences. The tokens identified as stop words may be eliminated by the tokenizer module to enable the data processing arrangement have an improved processing speed which results in efficient interpretation of the contextual meaning of the tokens. Optionally, metrics such as term frequency-inverse document frequency (tf-idf) may be employed by the tokenizer module to identify stop words present in the plurality of documents.

Optionally, identifying and analyzing the one or more expressions associated to each of the plurality of tokens from the ontological databank refers to determining the one or more words in the ontological databank which are synonyms to each of the plurality of tokens. In an example, a token such as 'cancer' is associated with words such as 'tumor', 'neoplasm', and 'metastasis' in the ontological databank. The one or more relevant expressions associated to each of the plurality of tokens are identified to enable improved interpretation of the contextual meaning of the one or more sentences in the plurality of documents. In a scenario comprising retrieval of documents from a database, documents having information related to tokens as well as synonyms of the tokens are retrieved. In such a case, an increased number of relevant documents are retrieved.

Moreover, the data processing arrangement is configured to determine token coordinates of each of the plurality of tokens in the multi-dimensional space. Typically, the token coordinates refer to a location of a token in the multi-dimensional hierarchical space, wherein the location is specified by a set of numbers, letters, symbols, or a combination thereof. It will be appreciated that each word from amongst the one or more words in the ontological databank represented into the multi-dimensional hierarchical space has a defined location. Pursuant to embodiments of the present disclosure, the data processing arrangement determines location (namely, coordinate) pertaining to each of the token from amongst the plurality of tokens for each of the plurality of documents. Optionally, the data processing arrangement employs algorithms such as Word2Vec, ELMo, GLoVe and the like for determining the token coordinates of each of the plurality of tokens. It will be appreciated that same token in different domains may have different locations.

In an example, a token from amongst the plurality of tokens may be 'oligodendrocytes'. In such case, a location of the token in the multi-dimensional hierarchical space (namely, the token coordinate) may be defined by a set of numbers in Euclidean cartesian coordinate form such as [−0.22, 0.22, 0.221, 0.3443]. In another example, a location of the token in the multi-dimensional hierarchical space may be defined by a combination of numbers and characters in a vector form such as (−0.22x+0.22iy).

Optionally, the data processing arrangement is configured to determine sentence coordinates for each of the one or more sentences in the plurality of documents based on token coordinates of tokens in the given sentence and token coordinates of tokens neighboring to the given sentence. The term "sentence coordinate" refers to a location of a sentence from amongst the one or more sentences comprised in a document of the plurality of documents. Specifically, the sentence coordinates define a location of the given sentence by way of a set of numbers, letters, symbols, or a combination thereof in the multi-dimensional hierarchical space. Optionally, the determination of sentence coordinates enables in determining common sentences that occur frequently in a specific domain or a specific language. Moreover, the sentence identified as common sentences may be eliminated by the tokenizer module to enable the data processing arrangement have an improved processing speed which results in efficient interpretation of the contextual meaning of the tokens.

In an embodiment, determination of the token coordinates further employs unsupervised machine learning techniques. The term "unsupervised learning techniques" refers to a learning technique employed by the data processing arrangement to train the programmable components using unlabeled training dataset or unstructured training information. Specifically, the training dataset employed for training the programmable components using unsupervised learning techniques is neither classified nor labelled. More specifically, the unsupervised learning techniques employ unsupervised machine learning algorithms that are not trained with a desired output. Alternately, the unsupervised machine learning algorithms analyze the unlabeled training dataset provided for training and further interpret the training dataset so as to sort the training data without using predefined labels.

In an embodiment, the data processing arrangement is configured to identify, using the identifier module, the entity type associated with each of the tokens of the plurality of tokens for each of the plurality of documents, wherein the entity type is identified based on the token coordinates in the multi-dimensional hierarchical space representing the ontological databank. The entity type of each of the tokens is identified by matching each of the tokens with the one or more words in the ontological databank using the token coordinates. The entity type of the one or more words matched with each of the tokens is referred to as the entity type of the token. The term "entity type", refers to a collection (namely, duster, group and so forth) of contextually similar information. Specifically, entity type is a collection of contextually similar words in the ontological databank. Furthermore, the entity type may include many synonyms, abbreviations, linguistic variations, morphological forms, and/or derivational entities of the information. In other words, the entity type refers to more than one broad category, into which the one or more words in the ontological databank is categorized, wherein one broad category involves certain distinct characteristics in comparison to the other broad category. In an example, the ontological databank related to psychology domain can comprise entity types such as behavioral theories, cognitive theories, personality theories, development theories and social theories. In another example, the ontological databank related to life science domain can comprise entity type such as diseases, drug, target, and pathway. In yet another example, an entity type of a token such as "pelle" is identified as gene. The term "identifier module" refers to a structure including an arrangement of interconnected programmable and/or non-programmable components that are configured to receive and process the token coordinates of the plurality of tokens to identify the entity type of the plurality of tokens. Moreover, the identifier module has a circuitry comprising one or more electronic components which enables the identifier module to identify the entity type associated with each of the tokens of the plurality of tokens.

Moreover, the data processing arrangement is configured to interpret, using the interpreter module, the contextual meaning of each of the tokens of the plurality of tokens for each of the plurality of documents. The contextual meaning of a specific token of the plurality of tokens refers to the meaning of the specific token with respect to the other tokens in the one or more sentences based on the entity type of each of the tokens and the domain of the document. The term "interpreter module" refers to a structure including an arrangement of interconnected programmable and/or non-programmable components that are configured to receive and process the plurality of tokens to interpret contextual meaning of the plurality of tokens. Moreover, the interpreter module has a circuitry comprising one or more electronic components which enables the interpreter module to interpret contextual meaning of the plurality of tokens. Specifically, contextual meaning may refer to meaning of the specific token based on the entity type of other words in one sentence. Moreover, the contextual meaning may refer to meaning of one or more tokens in one sentence based on the entity type of the one or more tokens in another sentence. In an example, a contextual meaning of a token such as 'administering' in a sentence such as 'treatment includes administering therapeutic agent' is based on the entity type of the other tokens such as 'treatment', 'therapeutic agent' such that contextual meaning of 'administering' is 'injecting the therapeutic agent to monitor its effects'. The interpretation of the contextual meaning of the plurality of tokens enables in determining a sentiment and intent of the one or more sentences of the plurality of documents. In an example, a sentence such as 'a revolutionary new drug for cancer' may have a negative sentiment when the other sentences have general awareness entities. In another example, a sentence such as 'a revolutionary new drug for cancer' may have a positive sentiment when the other sentences have medical science entities.

In an embodiment, the interpreter module is employed for performing plurality of document processing activities. In an example, the plurality of document processing activities comprises at least one of a classification of each of the tokens of the plurality of tokens for each of the plurality of documents; a sentiment analysis of each of the tokens of the plurality of tokens for each of the plurality of documents; and an intent analysis of each of the tokens of the plurality of tokens for each of the plurality of documents. In another example, the plurality of document processing activities comprises at least one of clustering tokens related to a specific domain and domain modelling. Optionally, the classification of each of the tokens of the plurality of tokens for each of the plurality of documents refers to the entity type of each of the tokens identified by the identifier module. In an example, classification of each of the tokens of a document enables in determining a scientific domain of the document. Optionally, the sentiment analysis of each of the tokens of the plurality of tokens for each of the plurality of documents enables in determining the sentiment associated with each of the one or more sentences comprising the plurality of tokens. Optionally, a sentiment of a sentence may be positive or negative or neutral. In a scenario comprising retrieval of documents from a database, sentiment analysis of search query enables in retrieving documents based on the sentiment of the search query. In an example, a sentiment analysis of a search query such as 'J.P. Morgan is bullish' results in a positive sentiment based on determination of an entity type of each of the tokens in the search query and domain of the search query relating to stock market. In such a case, documents relating to J.P. Morgan being bullish in buying stocks in the stock market are retrieved. Optionally, the intent analysis of each of the tokens of the plurality of tokens for each of the plurality of documents enables in determining the intent associated with each of the one or more sentences comprising the plurality of tokens. In an example, intent analysis of a document comprising sentences such as 'Treatment of lung cancer may be performed using PD1 antibody. Such antibody is to be administered at 2 mg/ml per day' results in intent of the document to be 'treatment of lung cancer'. Optionally, intent analysis of documents enables in retrieving documents based on a search query relating to similar intent as the intent of the documents.

Optionally, the plurality of document processing activities performed by the interpreter module enables determination of at least one of concept-based searching and summary generation. Optionally, concept-based searching from a database of the plurality of documents enables in retrieving documents based on the classification of the concept, intent analysis of the concept and sentiment analysis of the concept. In such a case, the documents retrieved based on concept-based searching are more relevant to the concept. Optionally, based on the retrieved documents which are relevant to the concept used for concept-based searching, a summary is generated to produce concise output to concept based searching.

In an embodiment, the analyzer module, the tokenizer module and the interpreter module employ machine learning algorithms. The machine learning algorithms employ artificial intelligent system. Throughout the present disclosure, the term "artificial intelligence system" as used herein relates to computationally intelligent system that combines knowledge, techniques, and methodologies for controlling a bot or other element within a computing environment. Furthermore, the artificial intelligence system is configured to apply knowledge that can adapt it-self and learn to do better in changing environments. Additionally, employing any computationally intelligent technique, the artificial intelligence system is operable to adapt to unknown or changing environment for better performance. The artificial intelligence system includes fuzzy logic engines, decision-making engines, pre-set targeting accuracy levels, and/or programmatically intelligent software. Artificial intelligence system in the context of the present disclosure relates to software-based algorithms that are executable upon computing hardware and are operable to adapt and adjust their operating parameters in an adaptive manner depending upon information that is presented to the software-based algorithms when executed upon the computing hardware. Optionally, the artificial intelligence system includes neural networks such as recurrent neural networks, recursive neural networks, feed-forward neural networks, convolutional neural networks, deep belief networks, and convolutional deep belief networks; self-organizing maps; deep Boltzmann machines; and stacked de-noising auto-encoders.

Optionally, artificial intelligence system employs any one or combination of the following computational techniques: constraint program, fuzzy logic, classification, conventional artificial intelligence, symbolic manipulation, fuzzy set theory, evolutionary computation, cybernetics, data mining, approximate reasoning, derivative-free optimization, decision trees, or soft computing.

Optionally, the analyzer module, the tokenizer module, and the identifier module may be employed by the system parallelly to enable the system have a higher speed in interpreting the contextual meaning of each of the tokens of the plurality of tokens for each of the plurality of documents.

Optionally, the system is operable to interpret an accurate contextual meaning of each of the tokens of the plurality of tokens by establishing a syntactic difference of each of the plurality of tokens based on the identification of entity type of the plurality of tokens and domain associated with each document of the plurality of documents. In an example, an existing system may interpret two sentences such as 'Person admitted to', 'Person is admitted to' to have a similar meaning, while the system discussed in the present disclosure identifies a different meaning of the two sentences as the system identifies the domain of the document having sentence 'Person admitted to' as general awareness domain and domain of the document having sentence 'Person is admitted to' as medical science domain.

Furthermore, the system disclosed herein may be implemented in an electronic system. Specifically, the electronic system may be a medical device operated by a user. In an example, a user of a medical device consumes eggs daily. In such a case, a document published in a research publication having information relating to intake of food items and their effects has a sentence 'Daily consumption of eggs increases risk of heart diseases'. In such a case, a medical device obtains the document and interprets contextual meaning of the aforesaid sentence. Furthermore, in such a case, based on the interpretation of the contextual meaning, the medical device sends a notification to the user as well as a dietician of the user to enable change in diet of user based on the information in the document.

Moreover, the present description also relates to the method as described above. The various embodiments and variants disclosed above apply mutatis mutandis to the method.

Optionally, the analyzer module, the tokenizer module, and the interpreter module employ machine learning algorithms.

Optionally, the method includes analyzing the one or more sentences of the plurality of documents, using the analyzer module, to determine a specific language associated with each of the plurality of documents.

Optionally, the method for tokenization of the one or more sentences further includes:
- determining a frequency of occurrence of a given token in the plurality of documents for stop word identification;
- identifying one or more expressions associated to each of the plurality of tokens from the ontological databank; and
- analyzing the one or more expressions associated to each of the plurality of tokens to identify one or more relevant expressions associated to each of the plurality of tokens.

Optionally, the method includes employing unsupervised machine learning techniques for determination of the token coordinates further.

Optionally, the method includes employing the interpreter module for performing plurality of document processing activities.

More optionally, the method further comprises including information related to plurality of domains represented into the multi-dimensional space into an ontological databank.

Optionally, the method further comprises employing an identifier module, to identify an entity type associated with each of the tokens of the plurality of tokens for each of the plurality of documents, wherein the entity type is identified based on the token coordinates in the multi-dimensional space.

DETAILED DESCRIPTION OF THE DRAWINGS

Referring to FIG. 1, there is shown a block diagram of a system 100 comprising a data processing arrangement 102, in accordance with an embodiment of the present disclosure. The data processing arrangement 102 is communicably coupled to the ontological databank 104. The data processing arrangement 102 comprises an analyzer module 106, a tokenizer module 108, an identifier module 110 and an interpreter module 112.

FIG. 1 is merely an example, which should not unduly limit the scope of the claims herein. It is to be understood that the simplified illustration of the system 100 for interpreting contextual meaning of data is provided as an example and is not to be construed as limiting the system 100 to specific numbers, types, or arrangements of the database, and the processing arrangement. A person skilled in the art will recognize many variations, alternatives, and modifications of embodiments of the present disclosure.

Figure 2:
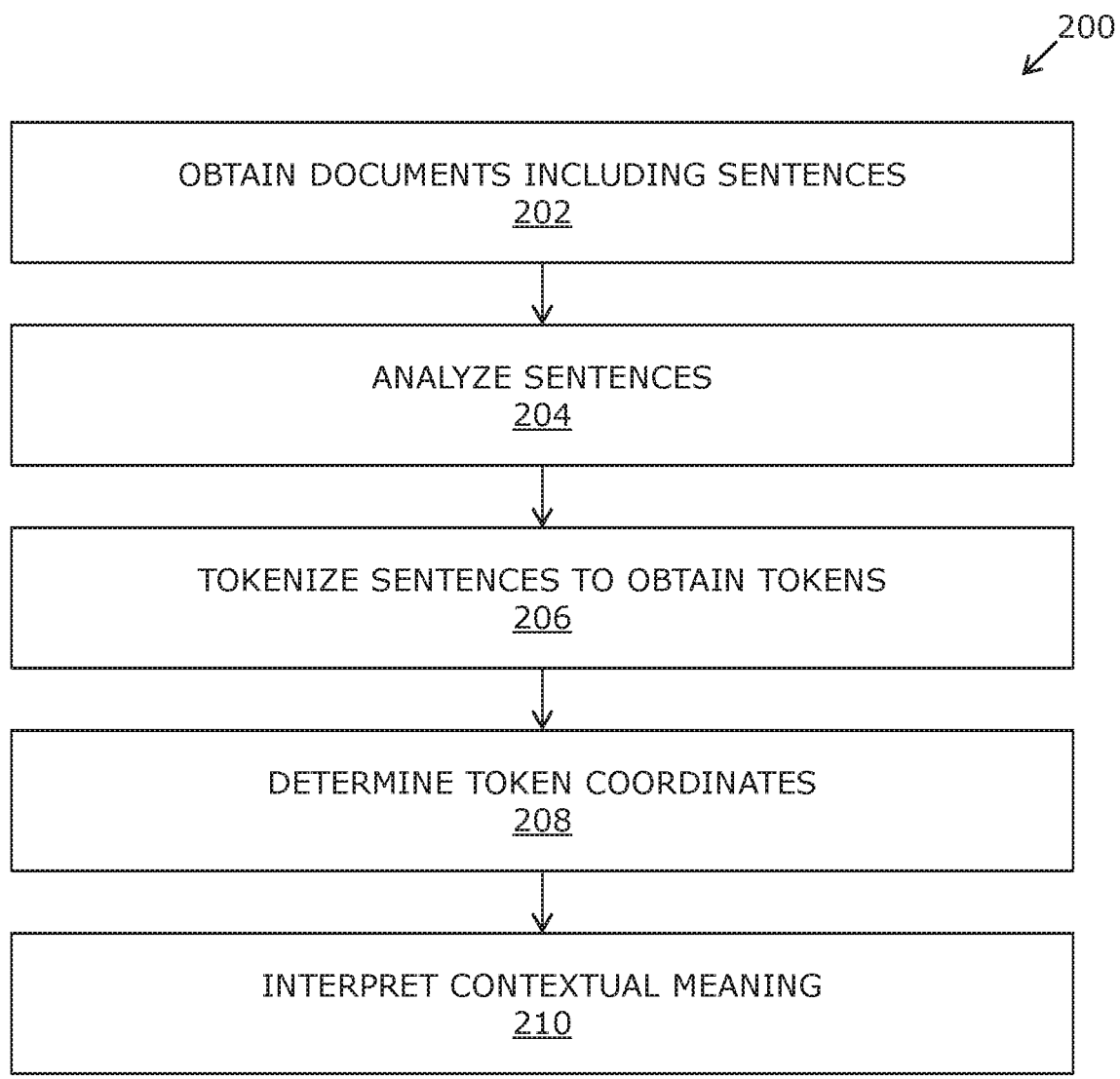
FIG. 2 is an illustration of steps of a method implemented via a system comprising a data processing arrangement, in accordance with an embodiment of the present disclosure.

Referring to FIG. 2, there is shown an illustration of steps of a method 200 implemented via a system comprising a data processing arrangement, in accordance with an embodiment of the present disclosure. At a step 202, a plurality of documents including one or more sentences is obtained. At a step 204, the one or more sentences of the plurality of documents are analyzed using an analyzer module to determine a specific domain associated with each of the plurality of documents. At a step 206, the one or more sentences in each of the plurality of documents are tokenized using a tokenizes module to obtain a plurality of tokens for each of the plurality of documents. At a step 208, token coordinates of each of the plurality of tokens are determined in the multi-dimensional space. At a step 210, a contextual meaning of each of the tokens of the plurality of tokens for each of the plurality of documents is interpreted using an interpreter module.

The steps 202, 204, 206, 208 and 210 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system comprising:
    an ontological databank that includes information related to a plurality of domains represented into a multi-dimensional space, wherein each domain comprises one or more words relating the domain;
    a data processing arrangement, communicably coupled to the ontological databank, configured to:
        obtain a plurality of documents including one or more sentences, wherein each of the plurality of documents is saved in one or more databases, wherein each of the plurality of documents is received from a user via a user device based on a search query;
        analyze the one or more sentences of the plurality of documents by mapping each word in the one or more sentences with each word in the ontological databank to determine a specific domain associated with each of the plurality of documents;
        tokenize the one or more sentences in each of the plurality of documents to obtain a plurality of tokens for each of the plurality of documents, wherein a given token comprises at least one of: a character, a word;
        determine token coordinates of each of the plurality of tokens in the multi-dimensional space;
        identify an entity type associated with each of the tokens of the plurality of tokens for each document of the plurality of documents, wherein the entity type is identified based on the token coordinates in the multi-dimensional space;
        interpret a contextual meaning of each token of a given sentence in a given document by determining distances between tokens of the given sentence in the multi-dimensional space, and also based on the identification of the entity type of the plurality of tokens and the domain associated with each document of the plurality of documents;
        classify the plurality of documents based on the contextual meaning of tokens; and
        display the retrieved plurality of documents on the user device.

2. The system of claim 1, wherein the data processing arrangement employs machine learning algorithms.

3. The system of claim 1, wherein the data processing arrangement analyses the one or more sentences of the plurality of documents to determine a specific language associated with each of the plurality of documents.

4. The system of claim 1, wherein the tokenization of the one or more sentences further includes:
    determining a frequency of occurrence of a given token in the plurality of documents for stop word identification;
    identifying one or more expressions associated to each of a plurality of tokens from the ontological databank; and analyzing the one or more expressions associated to each of the plurality of tokens to identify one or more relevant expressions associated to each of the plurality of tokens.

5. The system of claim 1, wherein determination of the token coordinates further employs unsupervised machine learning techniques.

6. The system of claim 1, wherein the data processing arrangement is employed for performing a plurality of document processing activities.

7. A method implemented via a system comprising:
including information related to a plurality of domains represented into a multi-dimensional space into an ontological databank, wherein each domain comprises one or more words relating the domain;
a data processing arrangement, communicably coupled to the ontological databank, configured to:
  obtain a plurality of documents including one or more sentences, wherein each of the plurality of documents is saved in one or more databases, wherein each of the plurality of documents is received from a user via a user device based on a search query;
  analyze the one or more sentences of the plurality of documents by mapping each word in the one or more sentences with each word in the ontological databank to determine a specific domain associated with each of the plurality of documents;
  tokenize the one or more sentences in each of the plurality of documents to obtain a plurality of tokens for each of the plurality of documents, wherein a given token comprises at least one of: a character, a word;
  determine token coordinates of each of the plurality of tokens in the multi-dimensional space;
  identify an entity type associated with each of the tokens of the plurality of tokens for each document of the plurality of documents, wherein the entity type is identified based on the token coordinates in the multi-dimensional space;
  interpret a contextual meaning of each token of a given sentence in a given document by determining distances between tokens of the given sentence in the multi-dimensional space, and also based on the identification of the entity type of the plurality of tokens and the domain associated with each document of the plurality of documents;
  classify the plurality of documents based on the contextual meaning of tokens; and
  display the retrieved plurality of documents on the user device.

8. The method of claim 7, wherein the data processing arrangement employs machine learning algorithms.

9. The method of claim 7, wherein the method includes analyzing the one or more sentences of the plurality of documents, using the data processing arrangement, to determine a specific language associated with each of the plurality of documents.

10. The method of claim 7, wherein the method for tokenization of the one or more sentences further includes:
determining a frequency of occurrence of a given token in the plurality of documents for stop word identification;
identifying one or more expressions associated to each of a plurality of tokens from the ontological databank; and
analyzing the one or more expressions associated to each of the plurality of tokens to identify one or more relevant expressions associated to each of the plurality of tokens.

11. The method of claim 7, wherein the method includes employing unsupervised machine learning techniques for determination of the token coordinates further.

12. The method of claim 7, wherein the method includes employing the data processing arrangement for performing a plurality of document processing activities.

13. A non-transitory computer readable storage medium containing program instructions for execution on a computer system, which when executed by a computer, cause the computer to perform a method, wherein the method is implemented via a system comprising:
an ontological databank that includes information related to a plurality of domains represented into a multi-dimensional space, wherein each domain comprises one or more words relating the domain;
a data processing arrangement, communicably coupled to the ontological databank, configured to:
  obtain a plurality of documents including one or more sentences, wherein each of the plurality of documents is saved in one or more databases, wherein each of the plurality of documents is received from a user via a user device based on a search query;
  analyze the one or more sentences of the plurality of documents by mapping each word in the one or more sentences with each word in the ontological databank to determine a specific domain associated with each of the plurality of documents;
  tokenize the one or more sentences in each of the plurality of documents to obtain a plurality of tokens for each of the plurality of documents, wherein a given token comprises at least one of: a character, a word;
  determine token coordinates of each of the plurality of tokens in the multi-dimensional space;
  identify an entity type associated with each of the tokens of the plurality of tokens for each document of the plurality of documents, wherein the entity type is identified based on the token coordinates in the multi-dimensional space;
  interpret a contextual meaning of each token of a given sentence in a given document by determining distances between tokens of the given sentence in the multi-dimensional space, and also based on the identification of the entity type of the plurality of tokens and the domain associated with each document of the plurality of documents;
  classify the plurality of documents based on the contextual meaning of tokens; and
  display the retrieved plurality of documents on the user device.

* * * * *